(12) United States Patent
Yamazaki et al.

(10) Patent No.: US 6,599,029 B2
(45) Date of Patent: Jul. 29, 2003

(54) FERRULE ASSEMBLY AND RECEPTACLE TYPE OPTICAL TRANSMISSION MODULE

(75) Inventors: Yousuke Yamazaki, Kawasaki (JP);
Hiroyuki Nobuhara, Kawasaki (JP);
Goji Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 09/804,032

(22) Filed: Mar. 13, 2001

(65) Prior Publication Data

US 2002/0034362 A1 Mar. 21, 2002

(30) Foreign Application Priority Data

Sep. 18, 2000 (JP) ........................................ 2000-281215

(51) Int. Cl.$^7$ ................................................. G02B 6/36
(52) U.S. Cl. ............................... 385/80; 385/91; 385/81
(58) Field of Search .............................. 385/88, 91, 89, 385/49, 60, 78, 77, 76, 52, 97, 98, 99, 80, 81

(56) References Cited

U.S. PATENT DOCUMENTS

| 5,764,836 A | 6/1998 | Roff ............................. 385/88 |
| 6,283,643 B1 * | 9/2001 | Serizawa ....................... 385/60 |

* cited by examiner

Primary Examiner—Javaid H. Nasri
(74) Attorney, Agent, or Firm—Staas & Halsey LLP

(57) ABSTRACT

A ferrule assembly includes a ferrule having a through-hole, a first end portion, a second end portion, and an intermediate portion between the first and second end portions, and an optical fiber inserted and fixed in the through-hole. The ferrule has at the intermediate portion a cutaway flat portion allowing the optical fiber inserted in the through-hole to be semi-exposed, and the optical fiber has its entire circumference held by the ferrule at least at the first and second end portions of the ferrule.

3 Claims, 21 Drawing Sheets

FERRULE ASSEMBLY AND RECEPTACLE TYPE OPTICAL TRANSMISSION MODULE

BACKGROUND OF THE INVENTION

1. Field of the Invention

The present invention relates to a ferrule assembly for connection with an optical part incorporating an optical fiber, and particularly to a receptacle-type optical transmission module using a ferrule assembly.

2. Description of the Related Art

In recent information communication field, increase of information amount is followed by a need to transmit a large quantity of information at high speed, and high-speed large-capacity optical communication networks such as optical subscriber systems are now spreading. For popularization of the optical subscriber systems, cost-down of optical modules is an unavoidable task. The cost of optical modules consists of parts cost, assembly cost, and test and adjustment cost; among others, the assembly cost and adjustment cost constitute a major part of the total cost. As a means of reducing the assembly cost, receptacle-type optical modules have come to be spotlighted in recent years.

Parts mounted on a printed wiring board to be incorporated in a communication device are generally classified into surface mounting type and through-hole mounting type. A representative example of the surface mounting type parts is LSI, which is so-called flat package type in shape. This type of parts are soldered by a technique called reflow soldering. Namely, a pasty solder is printed on a printed wiring board, a surface mounting type part is adhered to the pasty solder, and soldering is carried out in a conveyor furnace in which the solder surface temperature is brought to 220° C. or higher.

Representative examples of the through-hole mounting type parts are high-capacity capacitors and LSIs with a large number of terminals (200 terminals or more). The LSIs with a large number of terminals have a terminal form called PGA (Pin Grid Array). These through-hole mounting type parts are soldered by a technique called flow soldering. Namely, terminals of the through-hole mounting type part are inserted in through-holes of a printed wiring board, and soldering is carried out by placing the opposite side of the part mounting surface of the printed wiring board in a solder bath at a temperature of about 260° C.

For a technique of mounting optical modules on a printed wiring board by soldering just like the surface mounting type parts and the through-hole mounting type parts, the so-called pig-tail type optical modules with an optical fiber cord are unsuitable. Normally, an optical fiber cord has a nylon covering, which has a heat resistance of only about 80° C. and, therefore, will melt in a soldering step. In addition, the optical fiber cord itself causes troubles or difficulties in containing and handling at production sites, thereby conspicuously lowering the efficiency of mounting on printed wiring boards.

Therefore, in order to enable soldering of optical modules and contrive a reduction in production cost, it is essentially required to provide a so-called receptacle-type optical module which does not comprise an optical fiber cord. The receptacle-type optical module is an optical module having a connector portion so that an optical fiber cord having a covering with low heat resistance can be fitted to and detached from the module. The receptacle-type optical module allows application of a solder reflow step at high temperature and, therefore, can be mounted on a printed wiring board simultaneously with surface mounting type electronic parts.

By simultaneously mounting optical parts and electronic parts on a print wiring board, a plurality of mounting steps using solders having different melting points required in the prior art can be simplified, which promises a large reduction of cost. As a means of reducing adjustment cost, a self-alignment technique has been investigated. In the technique, guide portions specified in positional relationship with optical parts at high precision are formed on the optical part mounting substrate, and optical wave guide parts (optical fiber, ferrule, etc.) are mounted along the guides, thereby accomplishing optical coupling. The self-alignment technique makes it possible to omit alignment steps which require a large number of steps and high cost.

Japanese Patent Laid-open No. 11-264926 (1999) discloses a structure of an interface portion between a PLC (Planar Lightwave Circuit) and an optical fiber. The optical module described in the publication has a structure such that a ferrule incorporating an optical fiber is mounted along a groove formed in an optical device mounting substrate. This structure is characterized in that optical coupling can be achieved automatically (self-alignment) by precisely designing the relative positions of the groove and the optical part.

An optical module disclosed in Japanese Patent Laid-open No. 7-318764 (1995) proposes another mode of self-alignment in which a bare optical fiber is protruded from an end of a ferrule and the optical fiber is inserted and fixed in a guide groove formed in an optical device mounting substrate. This structure is characterized in that positioning of the optical fiber can be carried out directly by the guide groove and, therefore, a high mounting precision can be obtained.

As a further example of the prior art, Japanese Patent Laid-open No. 2000-171668 may be mentioned. An optical module described in this publication proposes a further mode of self-alignment in which a bare optical fiber is semi-exposed by cutting away a part of a ferrule and is mounted and fixed in a guide groove formed in an optical device mounting substrate. The optical module of this structure is characterized in that since a part of the ferrule is used for retaining the bare optical fiber, a retaining part can be omitted and adhesion area can be made small.

There are four characteristics required of an inexpensive and highly reliable receptacle-type optical module: (1) easy mounting, (2) high strength, (3) capability of end face polishing and measure against reflection, and (4) high positioning precision. Particularly, the end face polishing is expected much as a means of coping with reflection. Reduction of reflected-back light has become a major task in recent years, and in order to reduce reflected-back light from a value of about 25 dB at present to a value of not less than 40 dB required in future, a slant polishing structure in which a fiber end face is slanted against optical axis is effective. For realizing this structure, it is required that the fiber end can be polished.

The optical module described in the above-mentioned Japanese Patent Laid-open No. 11-264926 (1999) has the following problems. It is required to form a guide groove having a depth corresponding to the radius of the ferrule (about 650 μm in the case of an MU-type ferrule of standard specifications), so that etching time is increased and it is difficult to provide a protective film. In addition, a large sized optical part mounting substrate is required. The large guide groove leads to low controllability of width at the time of formation thereof, and long-time etching may easily produce an abnormal etched surface at a slant surface. Further, since positioning is carried out using the outer shape of the ferrule, a loss in optical coupling will be generated due to eccentricity of the inside diameter of the ferrule and eccentricity at the time of insertion of optical fiber.

The optical module disclosed in the Japanese Patent Laid-open No. 7-318764 (1995) has the following problems. It is impossible to polish end faces of the optical fiber. In addition, since the optical fiber is entirely exposed from the ferrule, there is a high danger of breaking of the optical fiber at the time of handling. Further, since an optical fiber fixing portion and a ferrule fixing portion are independent in the optical module, a stress may be generated at the boundary portion between the optical fiber and the ferrule, possibly producing bad effects on reliability.

The optical module disclosed in the Japanese Patent Laid-open No. 2000-171668 has the following problems. End face polishing is impossible because there is a high danger of breaking of fiber. Besides, since the bare optical fiber cannot be fixed to the ferrule at the cutaway flat portion, there is the danger of breaking of the optical fiber.

SUMMARY OF THE INVENTION

Accordingly, it is an object of the present invention to provide a receptacle-type optical module suitable for reductions in cost and size.

It is another object of the present invention to provide a ferrule assembly required for assembling a receptacle-type optical module.

In accordance with an aspect of the present invention, there is provided a ferrule assembly comprising: a ferrule having a through-hole, a first end portion, a second end portion on the opposite side of the first end portion, and an intermediate portion between the first end portion and the second end portion; and an optical fiber inserted and fixed in the through-hole; wherein the ferrule has at the intermediate portion a cutaway flat portion allowing the optical fiber inserted in the through-hole to be semi-exposed, and the optical fiber has its entire circumference held by the ferrule at least at the first and second end portions of the ferrule.

Preferably, the ferrule has a cut worked portion at the first end portion and/or the second end portion. According to the ferrule assembly of the present invention, it is possible to realize all of the above-mentioned four requirements, which cannot be fulfilled in the prior art.

(1) Since the entire circumference of the optical fiber is fixed to the ferrule at both ends of the ferrule, the ferrule assembly can be handled like an MU-type ferrule of standard specifications, and mounting thereof is easy.

(2) Because the entire circumference of the optical fiber is fixed to the ferrule at both ends of the ferrule, there is no danger of breaking of the optical fiber.

(3) End faces of the ferrule and the optical fiber can be polished.

(4) High-precision self-alignment by a bare optical fiber can be achieved.

In accordance with another aspect of the present invention, there is provided a block type ferrule assembly comprising: a block having a through-hole, a first end portion, a second end portion on the opposite side of the first end portion, and an intermediate portion between the first end portion and the second end portion; an optical fiber inserted and fixed in the through-hole; and a plurality of guide pins fixed to the first end portion of the block, wherein the block has at the intermediate portion a cutaway flat portion allowing the optical fiber inserted in the through-hole to be semi-exposed, and the optical fiber has its entire circumference held by the block at the first and second end portions of the block.

In accordance with a further aspect of the present invention, there is provided an optical module comprising: a substrate having a first groove and a second groove orthogonal to the first groove; an optical wave guide structure formed on the substrate, comprising an optical wave guide core portion having its one end aligned with one end of the first groove, and an optical wave guide clad portion covering the optical wave guide core portion; a ferrule having a through-hole, a first end portion, a second end portion on the opposite side of the first end portion, and an intermediate portion between the first and second end portions; and an optical fiber inserted and fixed in the through-hole, wherein the ferrule has at the intermediate portion a cutaway flat portion allowing the optical fiber inserted in the through-hole to be semi-exposed, the optical fiber has its entire circumference held by the ferrule at least at the first and second end portions, and the ferrule is fixed to the substrate at the cutaway flat portion so that the first end portion of the ferrule is inserted in the second groove, and the optical fiber is inserted in the first groove of the substrate with one end of the optical fiber abutted on one end of the optical wave guide core portion.

In accordance with a still further aspect of the present invention, there is provided an optical module comprising: a first substrate having a first groove and a second groove orthogonal to the first groove; a second substrate having a third groove and a fourth groove orthogonal to the third groove; a first optical wave guide structure formed on the first substrate, comprising a first optical wave guide core portion having its one end aligned with one end of the first groove, and a first optical wave guide clad portion covering the first optical wave guide core portion; a second optical wave guide structure formed on the second substrate, comprising a second optical wave guide core portion having its one end aligned with one end of the third groove, and a second optical wave guide clad portion covering the second optical wave guide core portion; a ferrule having a through-hole, a first end portion, and a second end portion on the opposite side of the first end portion; and an optical fiber inserted and fixed in the through-hole, wherein the ferrule has first and second cutaway flat portion allowing the optical fiber inserted in the through-hole to be semi-exposed, the optical fiber has its entire circumference held by the ferrule at least at the first and second end portions of the ferrule, and the ferrule is fixed to the first and second substrates respectively at the first and second cutaway flat portions so that the first end portion of the ferrule is inserted in the second groove of the first substrate, while the second end portion of the ferrule is inserted in the fourth groove of the second substrate, and the optical fiber is inserted in the first and third grooves of the first and second substrates, with one end of the optical fiber abutted on one end of the first optical wave guide core portion and with the other end of the optical fiber abutted on one end of the second optical wave guide core portion.

In accordance with a still further aspect of the present invention, there is provided an optical module comprising: a substrate with a first marker formed on its surface; an optical wave guide structure formed on the substrate, comprising an optical wave guide core portion, and an optical wave guide clad portion having a narrow first portion and a wide second portion each covering the optical wave guide core portion; a glass plate having a wide first groove, a narrow second groove, a third groove formed between the first and second grooves orthogonally to the first and second grooves and a second marker, said glass plate being fixed on the substrate so that the second marker is positioned to the first marker and the first groove contains the first portion of the optical wave guide clad portion; and a ferrule assembly including a ferrule having a through-hole, a first end portion, a second end portion, and an intermediate portion between the first and second end portions, and an optical fiber inserted and fixed in the through-hole, the ferrule having at the intermediate portion a cutaway flat portion allowing the optical fiber inserted in the through-hole to be semi-exposed, and the optical fiber having its entire circumference held by the ferrule at least at the first and second end portions of the ferrule, said ferrule assembly being fixed to the glass plate at the cutaway flat portion so that the first end portion of the ferrule is inserted in the third groove of the glass plate and the optical fiber is inserted in the second groove.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
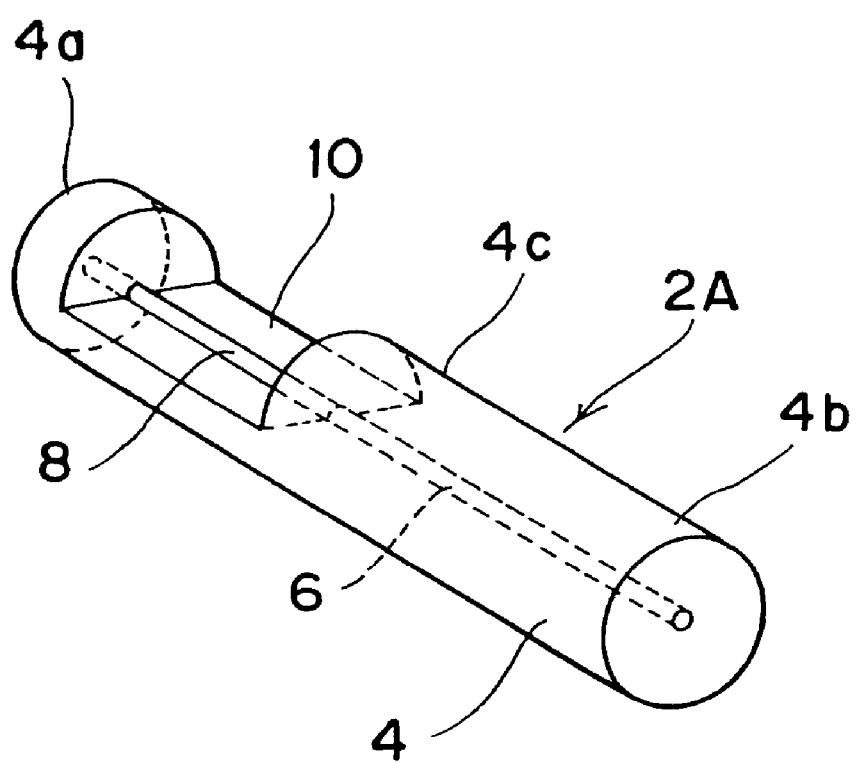
FIG. 1 is a perspective view of a key type ferrule assembly according to an embodiment of the present invention.

Now, a number of embodiments of the present invention will be described in detail referring to the drawings. In the description of the embodiments, substantially the same or similar component portions will be given the same symbols and description of a part of them will be omitted in order to avoid repeating the same description.

Referring to FIG. 1, there is shown a perspective view of a key type ferrule assembly 2A according to an embodiment of the invention. The key type ferrule assembly 2A comprises a ferrule 4 having a through-hole 6, and a bare optical fiber 8 inserted and fixed in the through-hole 6. The ferrule 4 is formed, for example, from zirconia. The ferrule 4 comprises a first end portion 4a, a second end portion 4b, and an intermediate portion 4c between the first and second end portions 4a and 4b, and has at the intermediate portion 4c a cutaway flat portion 10 such that the optical fiber 8 inserted in the through-hole 6 is semi-exposed.

The cutaway flat portion 10 is first formed by cutting away a portion of the ferrule 4, then the bare optical fiber 8 is inserted in the through-hole 6, and both end faces of the bare optical fiber 8 are made to be substantially flush with both end faces of the ferrule 4. The bare optical fiber 8 is adhered and fixed to the ferrule 4 in the through-hole 6 at portions other than the cutaway flat portion 10. Namely, in the key type ferrule assembly according to this embodiment, the bare optical fiber 8 is held by the ferrule at its entire circumference at both end portions 4a, 4b of the ferrule 4.

Figure 2A:
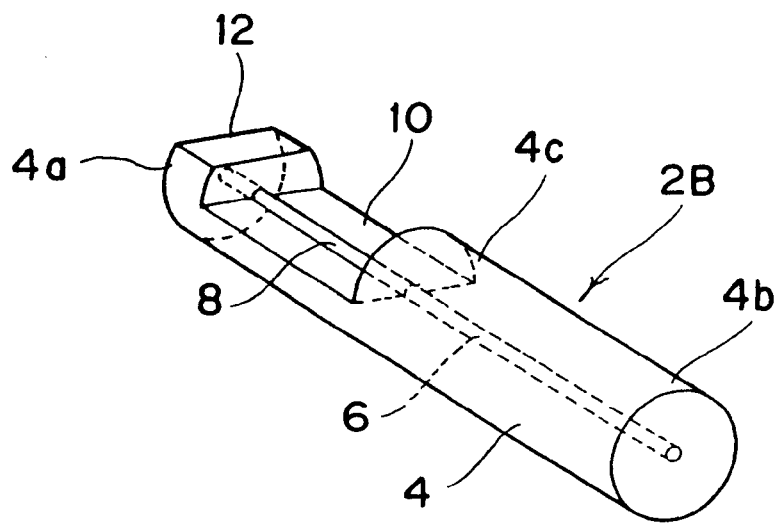
FIG. 2A is a perspective view of a key type ferrule assembly according to another embodiment of the invention.
Figure 2B:
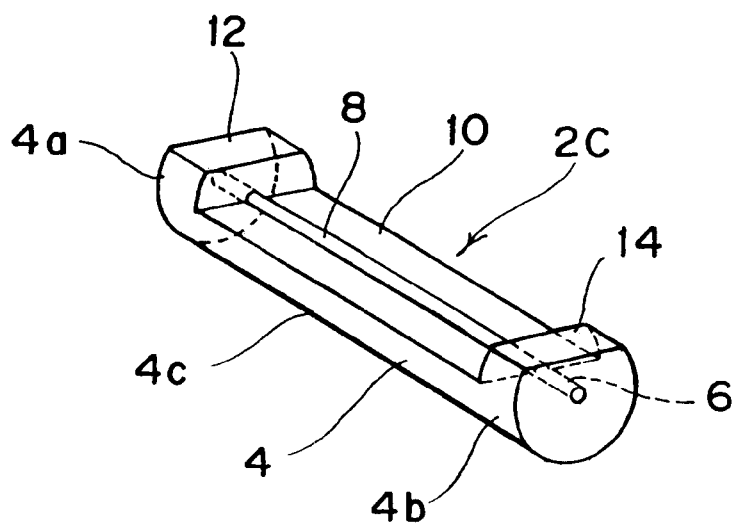
FIG. 2B is a perspective view of a key type ferrule assembly according to a further embodiment.

FIG. 2A shows a perspective view of a key type ferrule assembly 2B according to another embodiment. The key type ferrule assembly 2B has a cut worked portion 12 at a first end portion 4a. FIG. 2B shows a key type ferrule assembly 2C according to a further embodiment. In this embodiment, a cutaway flat portion 10 is large in length, and cut worked portions 12, 14 are provided at both end portions 4a, 4b.

Figure 3A:
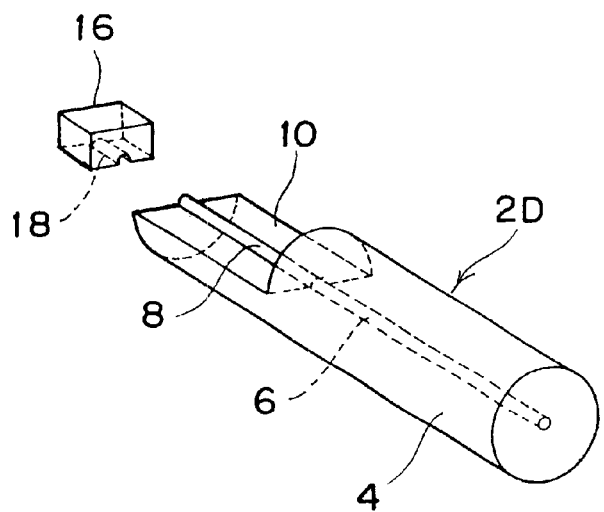
FIG. 3A is an exploded perspective view of a key type ferrule assembly according to a still further embodiment of the invention.
Figure 3B:
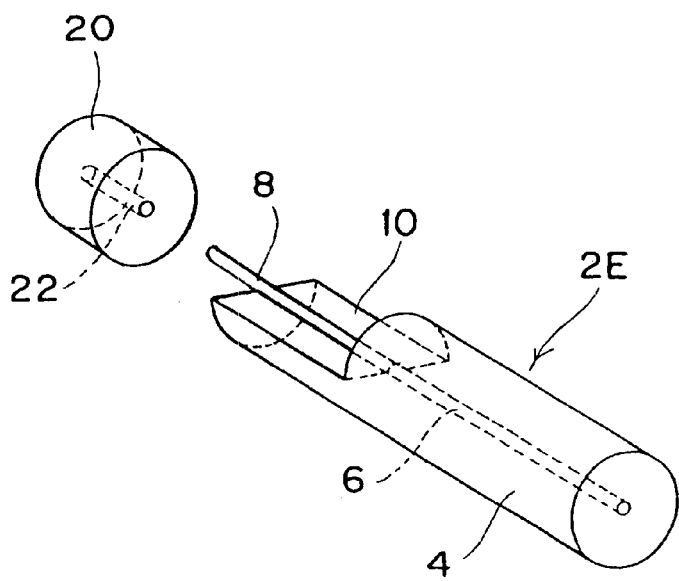
FIG. 3B is an exploded perspective view of a key type ferrule assembly according to a still further embodiment.

Referring to FIG. 3A, there is shown a key type ferrule assembly 2D according to a still further embodiment. In this embodiment, a cutaway flat portion 10 is provided at an end portion of the ferrule 4, and a retaining part 16 having a V-groove 18 is adhered to the cutaway flat portion 10 at the end portion of the ferrule 4. In this embodiment also, an optical fiber 8 has its entire circumference held by the ferrule 4 and the retaining member 16 at both end portions. FIG. 3B shows a key type ferrule assembly 2E according to a still further embodiment. In this embodiment, a bare optical fiber 8 is protruded from an end portion of a ferrule 4, and a bead part 20 having a through-hole 22 is adhered to an end face of the ferrule 4. The bare optical fiber 8 is inserted in the through-hole 22 of the bead part 20, and adhered and fixed there.

Figure 4:
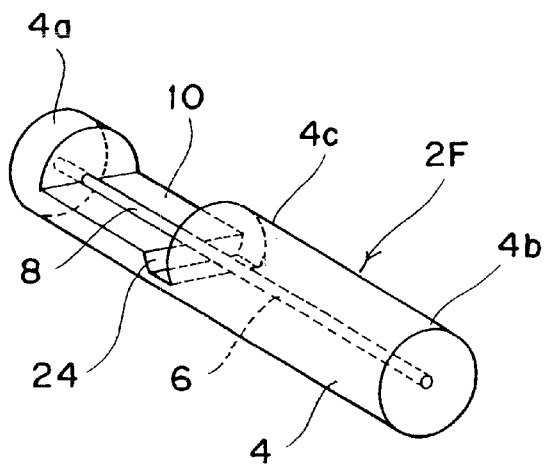
FIG. 4 is a perspective view of a key type ferrule assembly according to a still further embodiment of the invention.

Referring to FIG. 4, there is shown a key type ferrule assembly 2F according to a still further embodiment. In this embodiment, the cutaway flat portion 10 of the key type ferrule assembly 2A of the first embodiment is provided with a step groove 24 orthogonal to the through-hole 6. A bare optical fiber 8 is inserted in the through-hole 6 of the ferrule 4, and fixed there with an adhesive. The adhesive pressed out of the through-hole 6 is received in the step groove 24 and, therefore, the adhesive is prevented from sticking to the cutaway flat portion 10.

Figure 5:
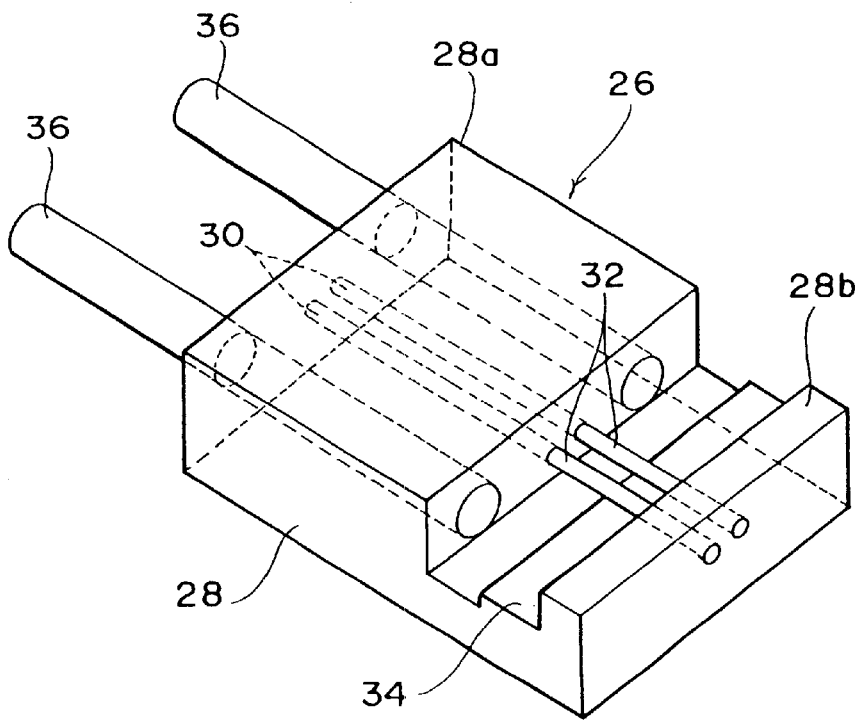
FIG. 5 is a perspective view of a block type ferrule assembly according to an embodiment of the invention.

Referring to FIG. 5, there is shown a perspective view of a block type ferrule assembly according to an embodiment of the invention. The block type ferrule assembly 26 comprises a block 28 having a plurality of through-holes. The block 28 has a cutaway flat portion 34 such that bare optical fibers 32 inserted in the through-holes 30 are semi-exposed. The block 28 having the cutaway flat portion 34 is formed by transfer molding of plastic using a mold.

The block 28 has a first end portion 28a and a second end portion 28b, and the optical fiber 32 is held by the block 28 at its entire circumference at the first and second end portions 28a, 28b. A pair of guide pins 36 are inserted and fixed in the block 28. Since the optical fiber 32 is held by the block 28 at the first and second end portions 28a, 28b, end faces of the optical fiber 32 can be polished.

Figure 6:
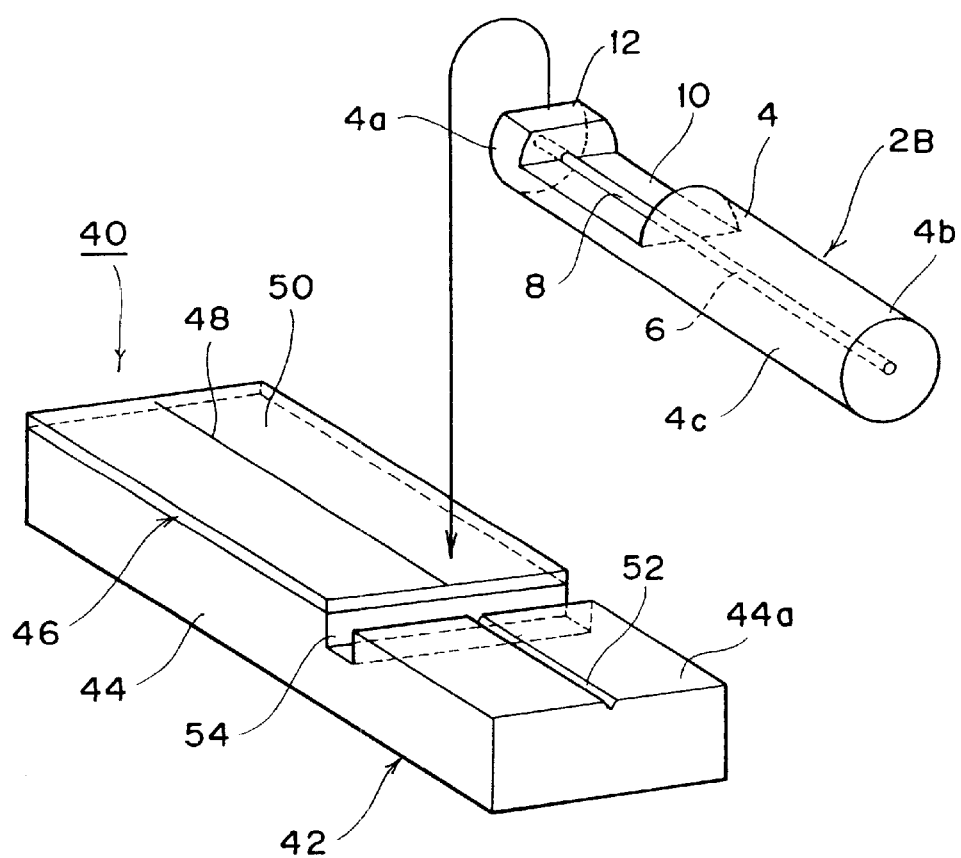
FIG. 6 is an exploded perspective view before assembly of an optical module according to a first embodiment of the invention.
Figure 7:
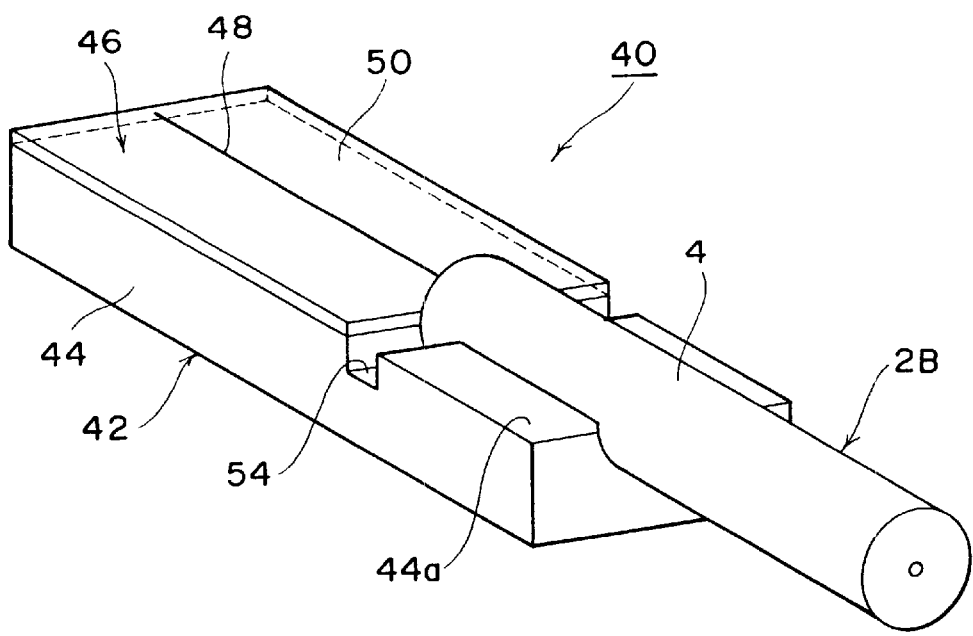
FIG. 7 is a perspective view after assembly of the optical module according to the first embodiment.
Figure 8:
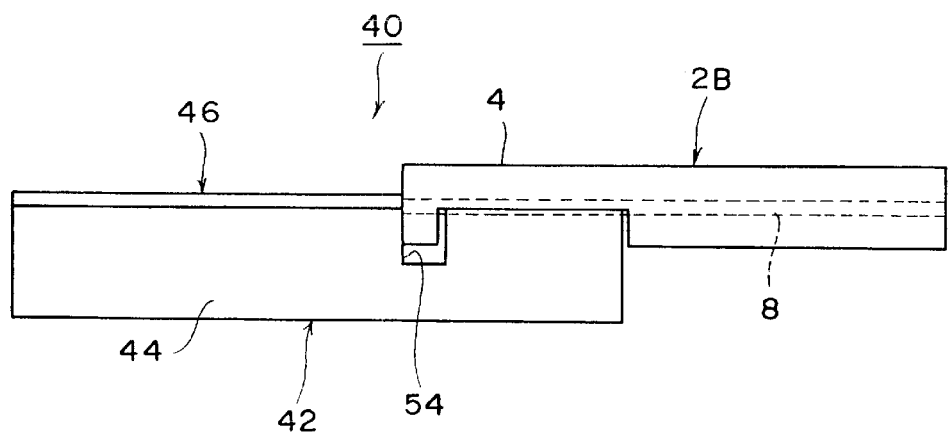
FIG. 8 is a side view of the optical module according to the first embodiment.

Referring to FIG. 6, there is shown an exploded perspective view of an optical module 40 according to a first embodiment of the invention. FIG. 7 is a perspective view of the optical module 40, and FIG. 8 shows a side view of the optical module 40. The optical module 40 comprises a PLC (Planar Lightwave Circuit) 42 and a key type ferrule assembly 2B. The PLC 42 comprises an optical wave guide structure 46 formed on a silicon substrate 44. The optical wave guide structure 46 comprises an optical wave guide core portion 48 and an optical wave guide clad portion 50 covering the optical wave guide core portion 48. The optical wave guide core portion 48 has a rectangular cross section with a side of about 8 µm, and light signals are propagated through the optical wave guide core portion 48 having a high refractive index.

At one end portion of the silicon substrate 44, a substrate surface 44a is exposed, and a V-groove 52 is formed by anisotropic etching of silicon. The position and size of the V-groove 52 are so selected that when a bare optical fiber having a circular cross section with a diameter of 125 µm is mounted in the V-groove 52, the center of a core portion (9.5 µm in diameter) of the bare optical fiber coincides with the center of the optical wave guide core portion 48. A groove 54 orthogonal to the V-groove 52 and having a rectangular cross section is formed by cutting the silicon substrate 44 with a dicing saw. The groove 54 is about 320 µm in width and about 300 µm in depth.

Although a slant surface is formed at one end portion in the longitudinal direction of the V-groove 52 at the time of forming the V-groove 52 by anisotropic etching of silicon, formation of the groove 54 by mechanically cutting the silicon substrate 44 with a dicing saw allows the optical fiber 8 mounted in the V-groove 52 to abut on the optical wave guide core portion 48. As has been described referring to FIG. 2A, the key type ferrule assembly 2B comprises a ferrule 4 having a through-hole 6 and a bare optical fiber 8 inserted and fixed in the through-hole 6. The ferrule 4 further has a cutaway flat portion 10 such that the optical fiber 8 inserted and fixed in the through-hole 6 is semi-exposed.

At one end portion 4a of the ferrule 4, the optical fiber 8 is held by the ferrule 4 at its entire circumference. Further, a cut worked portion 12 is provided at the one end portion 4a. The cut worked portion 12 has a length in the axial direction of about 300 µm and a height from the cutaway flat portion 10 of about 250 µm. Therefore, the cut worked portion 12 is fitted in the groove 54 of the PLC 42 with sufficient allowance, and does not hinder the positioning by the bare optical fiber 8. In assembling the optical module 40, the key type ferrule assembly 2B is turned upside down, then the cut worked portion 12 of the ferrule 4 is inserted in the groove 54 while the bare optical fiber 8 is inserted in the V-groove 52 so that one end of the optical fiber 40 is abutted on one end of the optical wave guide core portion 48, and the key type ferrule assembly 2B is adhered to the silicon substrate 44 at the cutaway flat portion 10.

Figure 9:
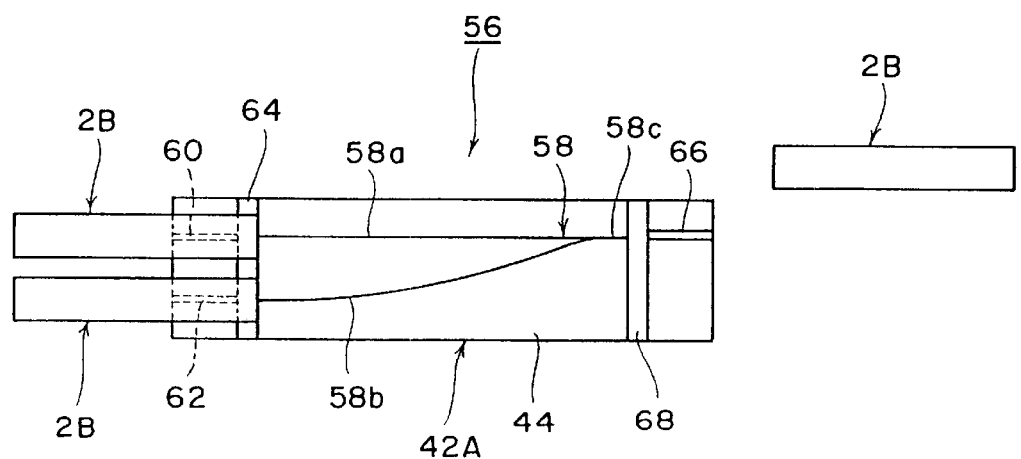
FIG. 9 is a plan view of an optical module according to a second embodiment of the invention.

Referring to FIG. 9, there is shown a plan view of an optical module 56 according to a second embodiment of the invention. A PLC 42A has a Y-branch optical wave guide structure 58 comprising three optical wave guides 58a, 58b, 58c. At the left end of a substrate 44, V-shaped guide grooves 60, 62 aligned with end portions of the optical wave guides 58a, 58b are formed by anisotropic etching of silicon. Further, a groove 64 is formed by a dicing saw.

At a right end portion of the substrate 44, a V-shaped guide groove 66 aligned with an end portion of the optical wave guide 58c is formed by anisotropic etching of silicon, and a groove 68 orthogonal to the guide groove 66 is formed by a dicing saw. Three key type ferrule assemblies 2B are mounted on the PLC 42A so that optical fibers are mounted in the guide grooves 60, 62, 66.

Figure 10:
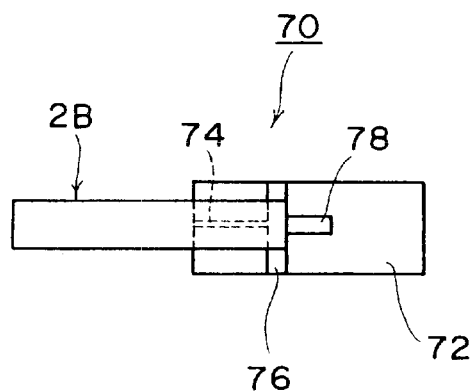
FIG. 10 is a plan view of an optical module according to a third embodiment of the invention.

Referring to FIG. 10, there is shown a plan view of an optical module 70 according to a third embodiment of the invention. A V-shaped guide groove 74 is formed in a silicon substrate 72 by a wet etching technique, and, in the same step, a marker for positioning of an optical device 78 is formed. A groove 76 orthogonal to the guide groove 74 is formed by a dicing saw. Further, a metal such as copper, aluminum or the like is vapor-deposited on the substrate 72, and patterning in a desired shape is carried out by photolithography to form electrodes. The optical device 78 is bonded onto the electrodes by aligning the marker on the substrate 72 and a marker on the optical device 78. Since the marker on the substrate 72 and the guide groove 74 are in an accurately determined positional relationship, when the key type ferrule assembly 2B is mounted on the substrate 72 so that the optical fiber in the key type ferrule assembly 2B is inserted in the groove 74, optical coupling with high precision can be achieved between a light-receiving/emitting portion of the optical device 78 and the core of the optical fiber 8 in the key type ferrule assembly 2B.

Figure 11:
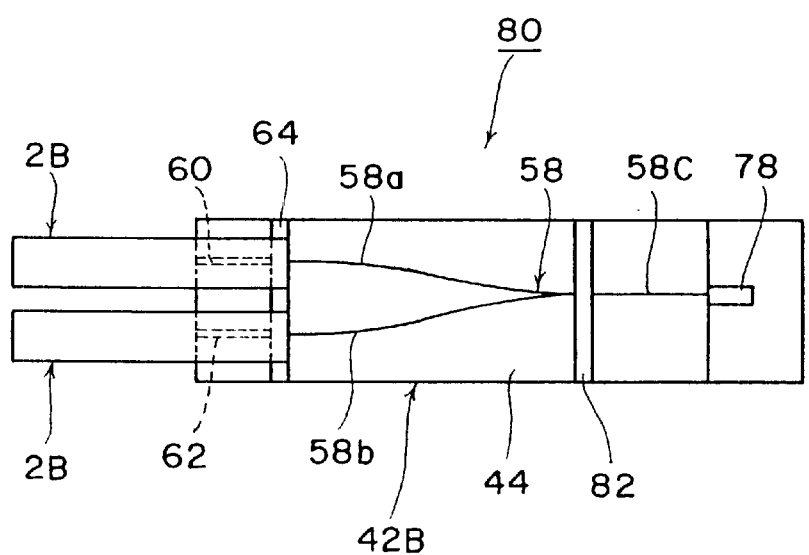
FIG. 11 is a plan view of an optical module according to a fourth embodiment of the invention.

Referring to FIG. 11, there is shown a plan view of an optical module 80 according to a fourth embodiment of the invention. In the optical module 80 of this embodiment, a Y-branch optical wave guide structure 58, guide grooves 60, 62 and a groove 64 orthogonal to the guide grooves 60, 62 are formed on a substrate 44, in the same manner as the optical module 56 of the second embodiment shown in FIG. 9. On the substrate 44, an optical device 78 such as a photo-diode (PD) is mounted so as to achieve optical coupling to an optical wave guide 58c. Further, a wavelength filter 82 is inserted and fixed substantially vertically to a groove formed in the substrate 44, at a branch portion of the Y-branch optical wave guide structure 58. Two key type ferrule assemblies 2B are mounted on the substrate 44 so that optical fibers are inserted in the guide grooves 60, 62.

It is assumed that the optical device 78 is a PD, and a light signal is inputted to the optical wave guide 58a through the key type ferrule assembly 2B on the upper side. The light passing through the wavelength filter 82 is detected by the PD 78, and the light reflected by the wavelength filter 82 is connected to the key type ferrule assembly 2B on the lower side through the optical wave guide 58b. On the other hand, where the optical device 78 is a light-emitting device, the light from the light-emitting device 78 passes through the wavelength filter 82, before being branched at the Y-branch and propagated through the optical wave guides 58a, 58b to be connected to the two key type ferrule assemblies 2B.

Figure 12:
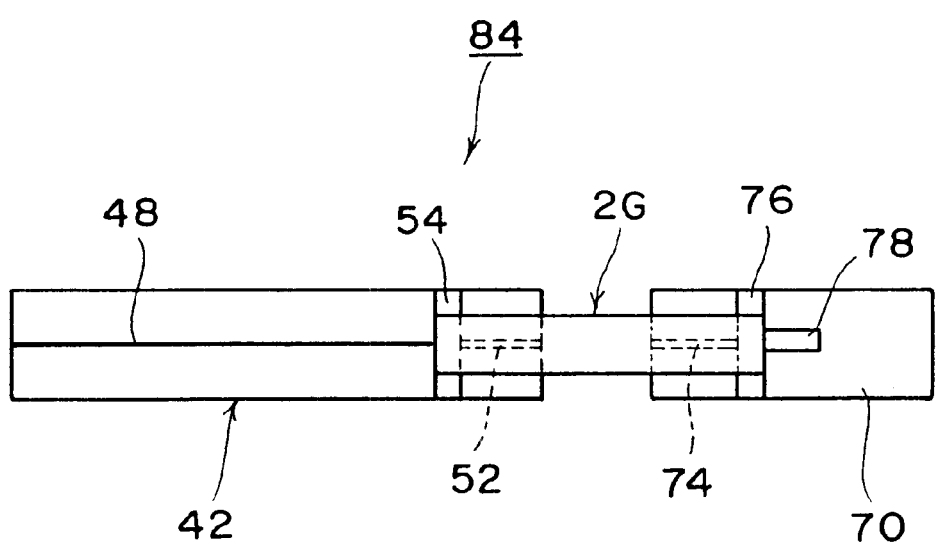
FIG. 12 is a plan view of an optical module according to a fifth embodiment of the invention.

Referring to FIG. 12, there is shown a plan view of an optical module 84 according to a fifth embodiment of the invention. The optical module of this embodiment is obtained by connecting a PLC 42 shown in FIG. 7 with a substrate 72 on which an optical device shown in FIG. 10 is mounted, by a key type ferrule assembly 2G having a structure shown in FIG. 18. The structure of the key type ferrule assembly 2G will be described referring to FIG. 18. The key type ferrule assembly 2G comprises a ferrule 4 having a through-hole 6 and a bare optical fiber 8 inserted and fixed in the through-hole 6.

The ferrule 4 has a first end portion 4a, a second end portion 4b, and an intermediate portion 4c between the first and second end portions 4a, 4b, and the optical fiber 8 is inserted and fixed in the through-hole 6 of the first and second end portions 4a, 4b and the intermediate portion 4c. Between the first and second end portions 4a, 4b and the intermediate portion 4c, there are provided cutaway flat portions 10a, 10b allowing the optical fiber 8 inserted in the through-hole 6 to be semi-exposed. Since the optical module 84 in this embodiment uses the key type ferrule assembly 2G having the above-mentioned structure, the optical device 78 mounted on the substrate 72 and the PLC 42 can be optically coupled efficiently. Further, the optical module 84 is excellent in assemblability.

Figure 13:
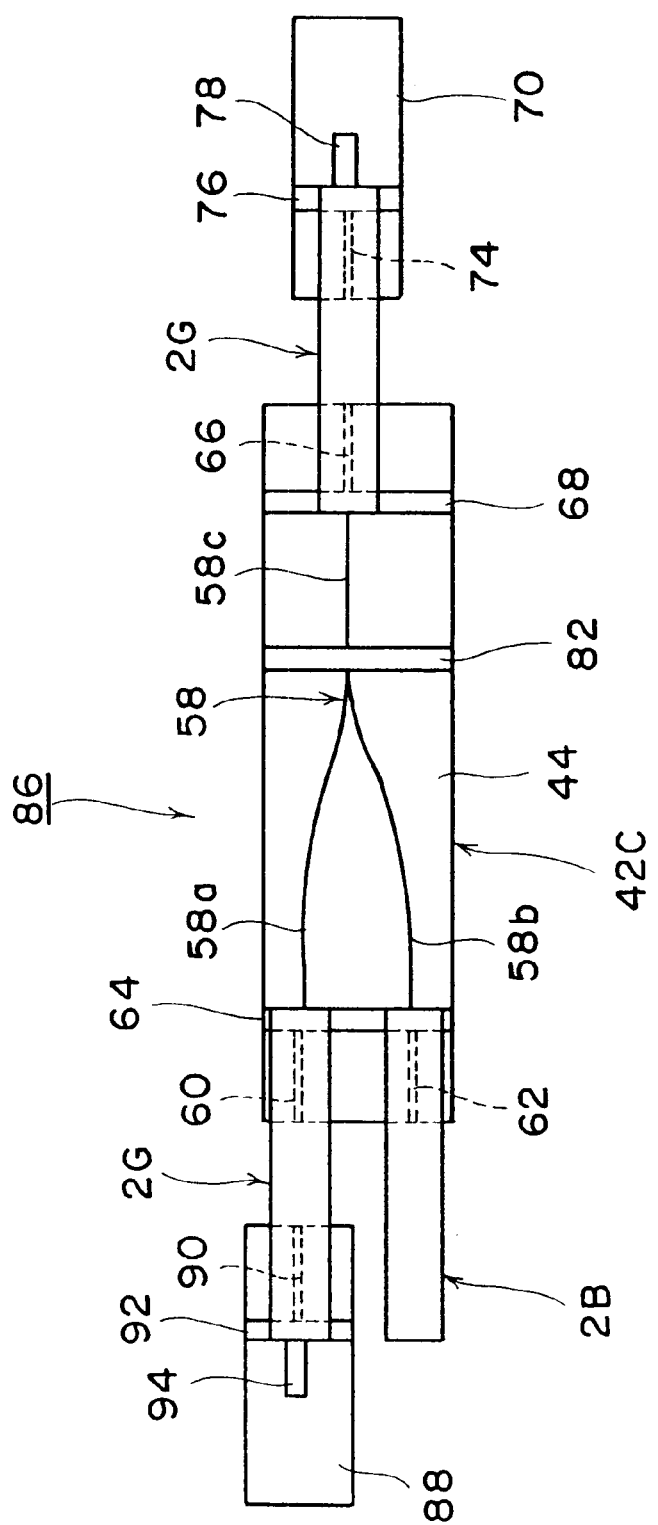
FIG. 13 is a plan view of an optical module according to a sixth embodiment of the invention.

Referring to FIG. 13, there is shown a plan view of an optical module 86 according to a sixth embodiment of the invention. A PLC 42C is similar to the PLC 42B shown in FIG. 11, and a V-shaped guide groove 66 and a groove 68 orthogonal to the guide groove 66 are formed at a right end portion of a substrate 44, in place of the optical module 78 mounted on the PLC 42B. A substrate 88 is similar to the substrate 72, and has a V-shaped guide groove 90 and a groove 92 orthogonal to the guide groove 90. A light-emitting device 94 such as a laser diode (LD) is mounted on the substrate 88. On the other hand, a light-receiving device 78 such as PD is mounted on the substrate 72.

The light-emitting device 94 mounted on the substrate 88 and an optical wave guide 58a of the PLC 42C are optically coupled by the key type ferrule assembly 2G. The light-receiving device 78 mounted on the substrate 72 and an optical wave guide 58c of the PLC 42C are optically coupled by the key type ferrule assembly 2G. An optical wave guide 58b of the PLC 42C is optically connected to the key type ferrule assembly 2B. Light emitted from the light-emitting device 94 is connected to the optical wave guide 58a of the PLC 42C through the kety type ferrule assembly 2G. The component passing through an optical filter 82 is connected to the light-receiving device 78 through the key type ferrule assembly 2G. On the other hand, the component reflected by the optical filter 82 is propagated through the optical wave guide 58b to be connected to the key type ferrule assembly 2B.

Figure 14:
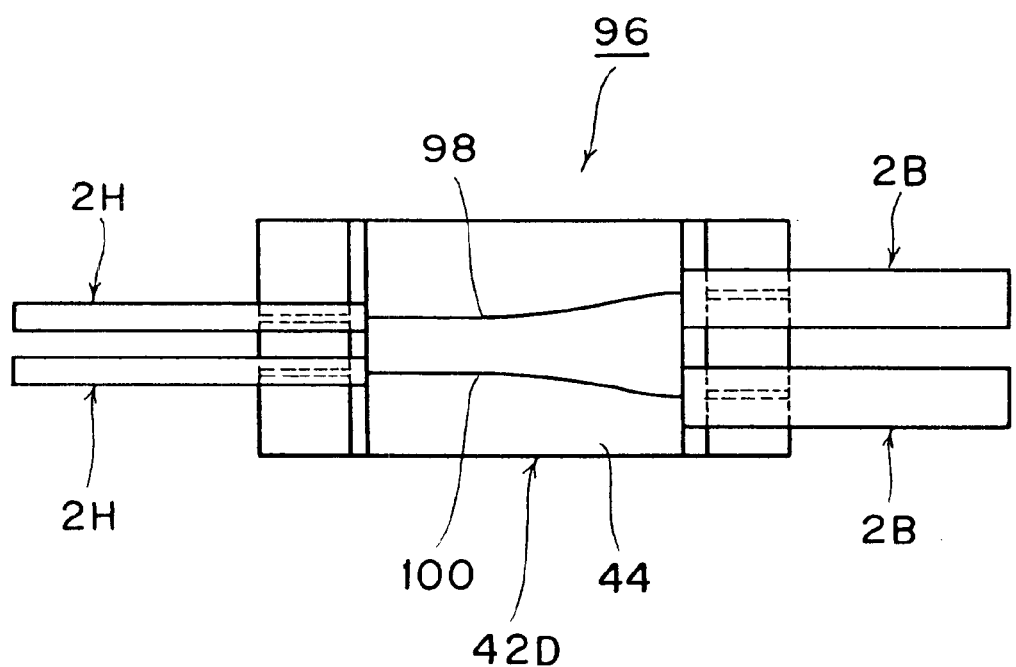
FIG. 14 is a plan view of an optical module according to a seventh embodiment of the invention.

Referring to FIG. 14, there is shown a plan view of an optical module 96 according to a seventh embodiment of the invention. The optical module 96 of this embodiment is an optical module having a pitch changeover function in which key type ferrule assemblies 2B, 2H having different diameters are mounted on both ends of a PLC substrate 44. A PLC 42D has two optical wave guides 98, 100. Two guide grooves are respectively formed at both ends of a PLC 42D, a key type ferrule assembly 2B having a diameter of 2.5 mm is mounted in the guide groove at one end portion, and a key type ferrule assembly 2H having a diameter of 1.25 mm is mounted in the guide groove at the other end.

The optical module 96 of this embodiment is not limited to the structure shown in the Figure, and the number of the ferrule assemblies is determined according to the number of the optical wave guides formed on the substrate 44. In addition, the optical wave guides may have a branch function, and the numbers of the key type ferrule assemblies mounted on left and right portions of the substrate 44 may differ from each other. Further, optical devices, optical filters or the like may be mounted on the substrate 44.

Figure 15:
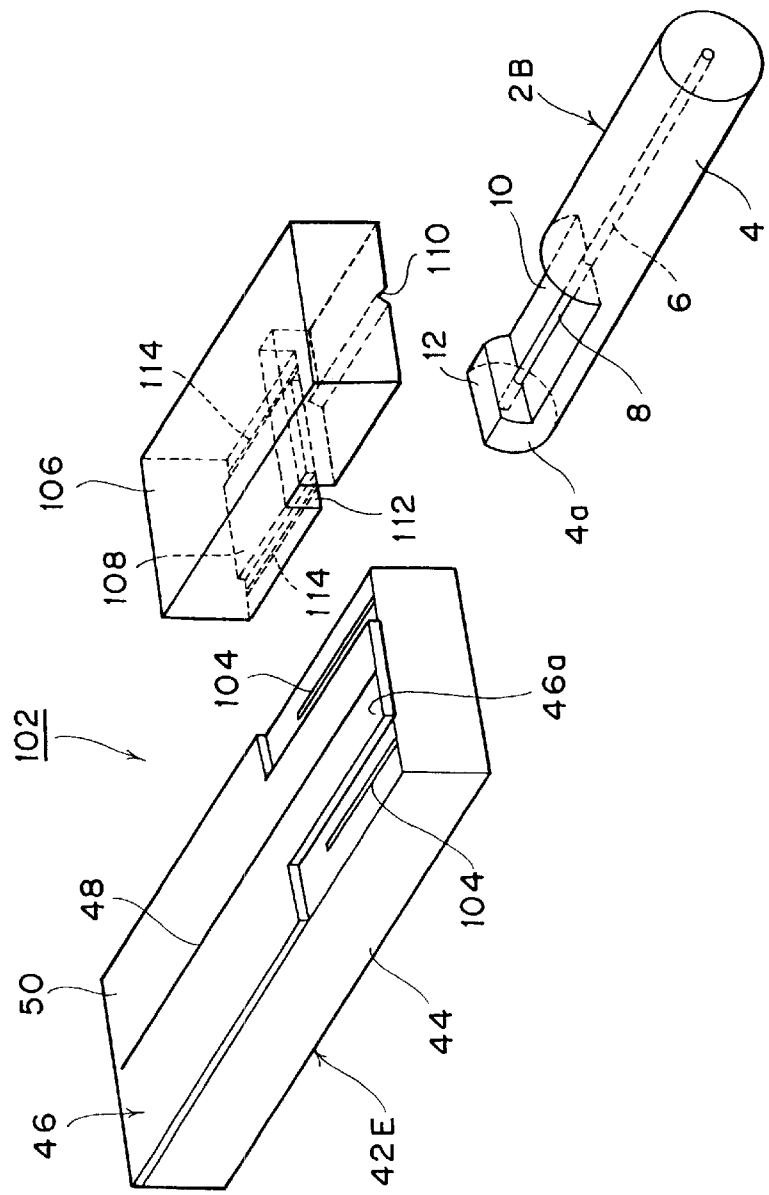
FIG. 15 is an exploded perspective view before assembly of an optical module according to an eighth embodiment of the invention.
Figure 16:
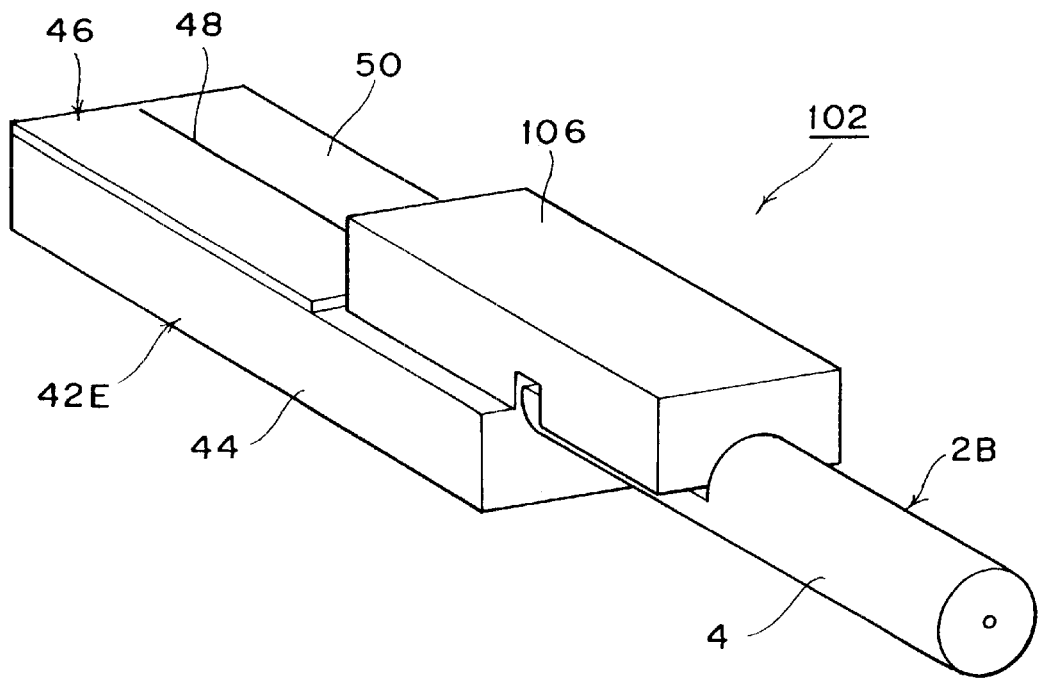
FIG. 16 is a perspective view after assembly of the optical module according to the eighth embodiment.
Figure 17:
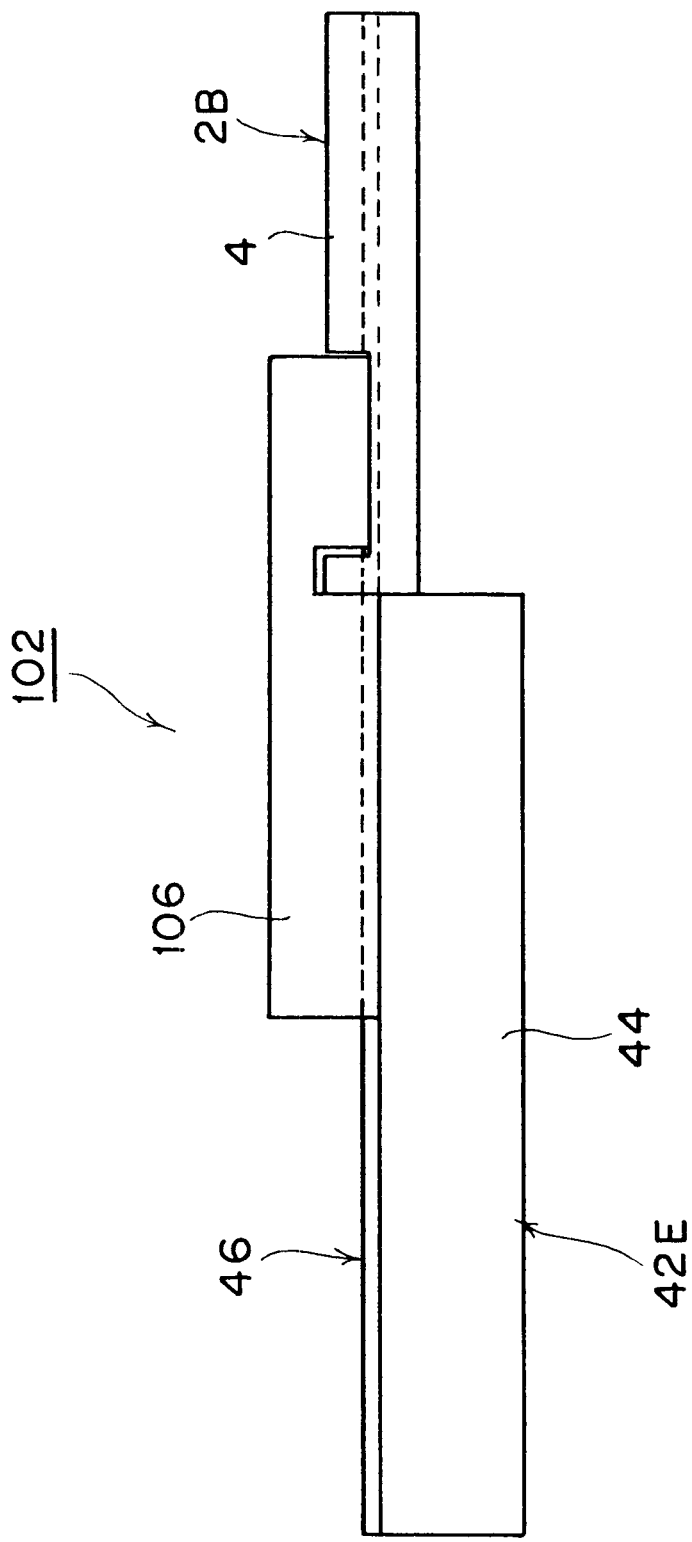
FIG. 17 is a side view of the optical module according to the eighth embodiment.

Referring to FIG. 15, there is shown an exploded perspective view of an optical module 102 according to an eighth embodiment of the invention. FIG. 16 is a perspective view of the optical module 102, and FIG. 17 is a side view of the optical module 102. The optical module 102 of this embodiment comprises a PLC 42E, a key type ferrule assembly 2B, and a glass plate 106. An optical wave guide structure 46 of the PLC 42E has a narrow portion 46a formed by removing a part of a clad layer 50, and an optical wave guide core portion 48 extends throughout the entire longitudinal length of a silicon substrate. On both sides of the narrow portion 46a of the optical wave guide structure 46, the surface of the silicon substrate 44 is exposed, and a pair of marker grooves 104 for positioning with a glass plate 106 are formed by etching.

The glass plate 106 is provided on its one side with a groove 108 for receiving the narrow portion 46a of the optical wave guide structure 46, a V-groove 110, and a groove 112 having a rectangular cross section formed between the groove 108 and the V-groove 110 to be orthogonal to the V-groove 110. The glass plate 106 further comprises a pair of marker grooves 114 for positioning with the PLC 42E. The groove 108, the V-groove 110, the groove 112 and the marker grooves 114 are formed by cutting, glass molding or the like. The glass plate 106 and the PLC 42E are adhered and fixed to each other so that the narrow optical wave guide structure portion 46a is contained in the groove 108 and that the marker grooves 104 of the PLC 42E and the marker grooves 114 of the glass plate 106 coincide with each other.

On the other hand, the glass plate 106 and the key type ferrule assembly 2B are adhered and fixed to each other with self-alignment positioning in which a cut worked portion 12 of the ferrule 4 is contained in the groove 112 of the glass plate 106 and a bare optical fiber 8 is fitted in the V-groove 110. A gap of about 10 μm is formed between a cutaway flat portion 10 of the key type ferrule assembly 2B and the lower surface of the glass plate 106, and the gap is filled with an adhesive, whereby the glass plate 106 and the key type ferrule assembly 2B are adhered and fixed to each other. The shape and size of the V-groove 110 and its positional relationships with the marker grooves 104, 114 are so selected that the center of the optical wave guide core portion 48 and the center of the core of the bare optical fiber 8 coincide with each other.

According to this embodiment, without providing the PLC 42E with a V-groove, the key type ferrule assembly 2B is connected to the PLC 42E through the glass plate 106 provided with the V-groove 110, whereby optical connection with low loss can be realized at low cost.

Figure 18:
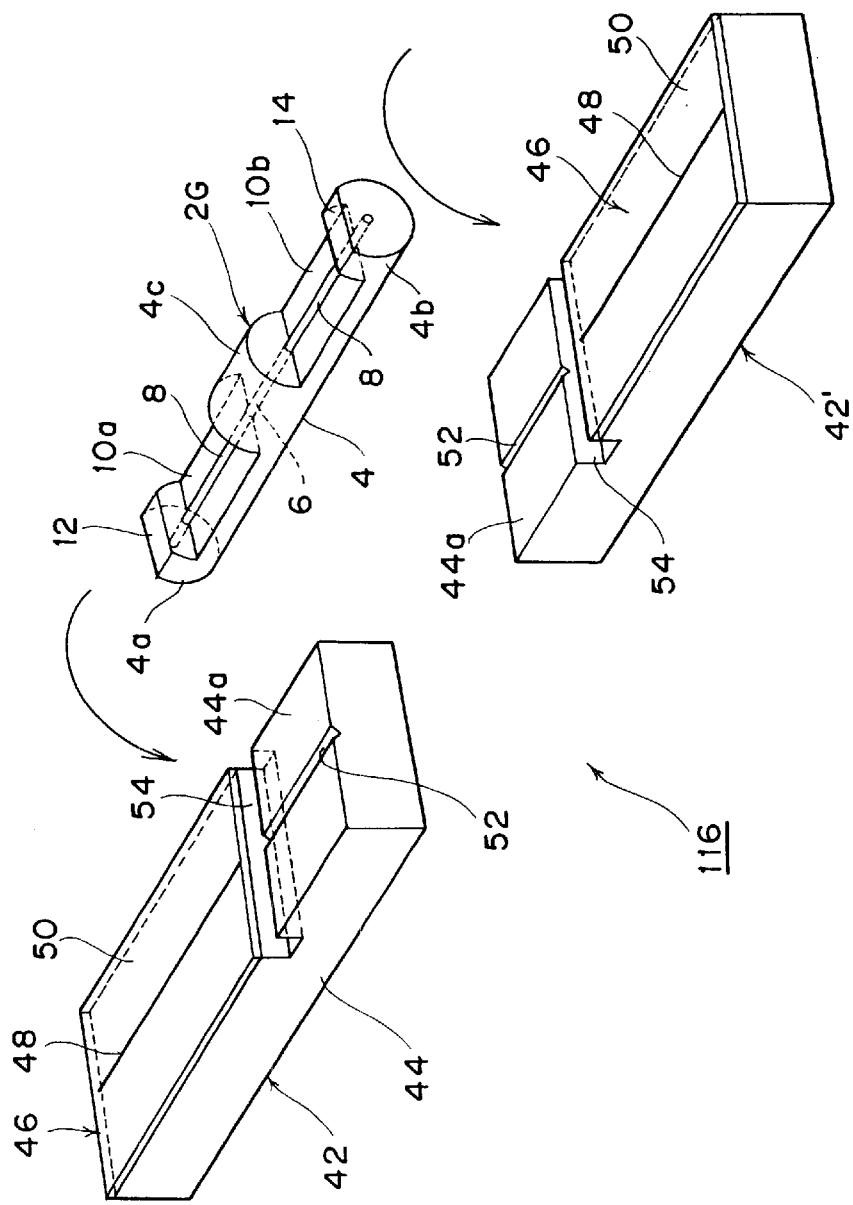
FIG. 18 is an exploded perspective view before assembly of an optical module according to a ninth embodiment of the invention.
Figure 19:
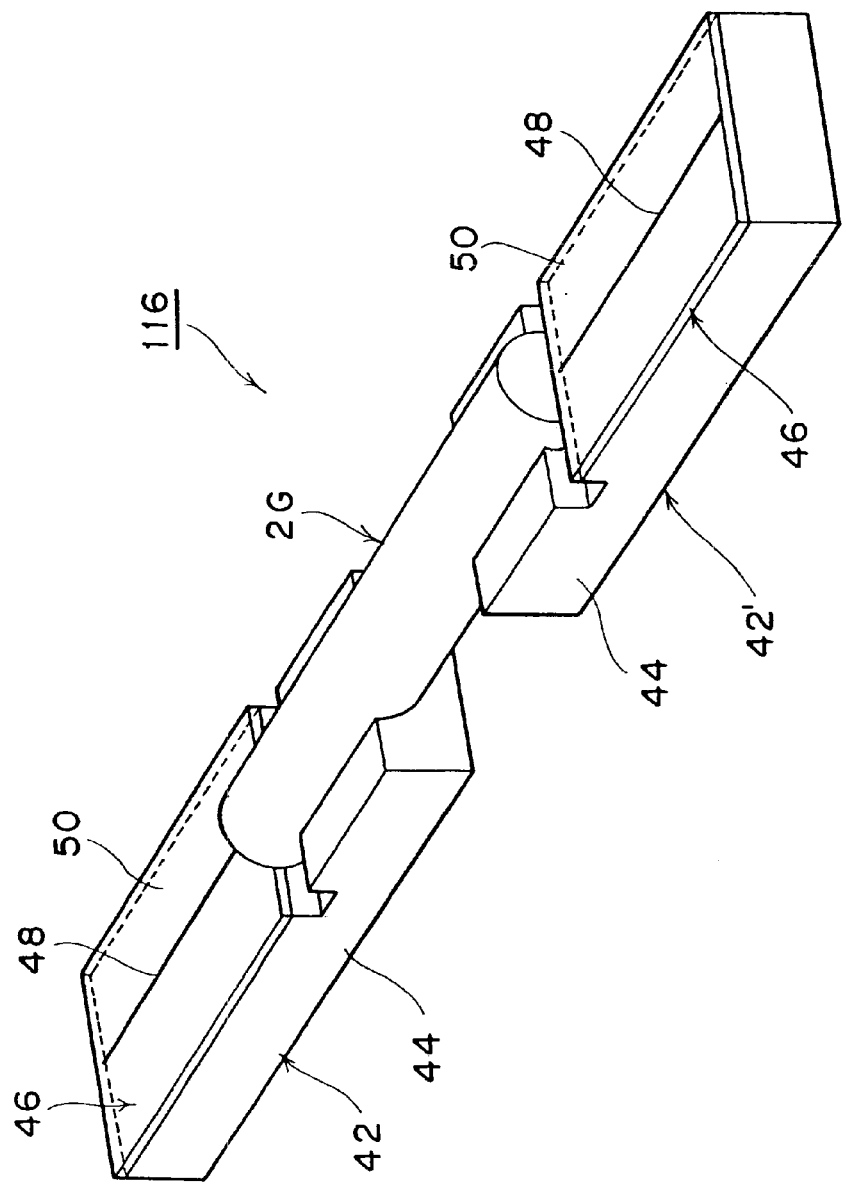
FIG. 19 is a perspective view after assembly of the optical module according to the ninth embodiment.
Figure 20:
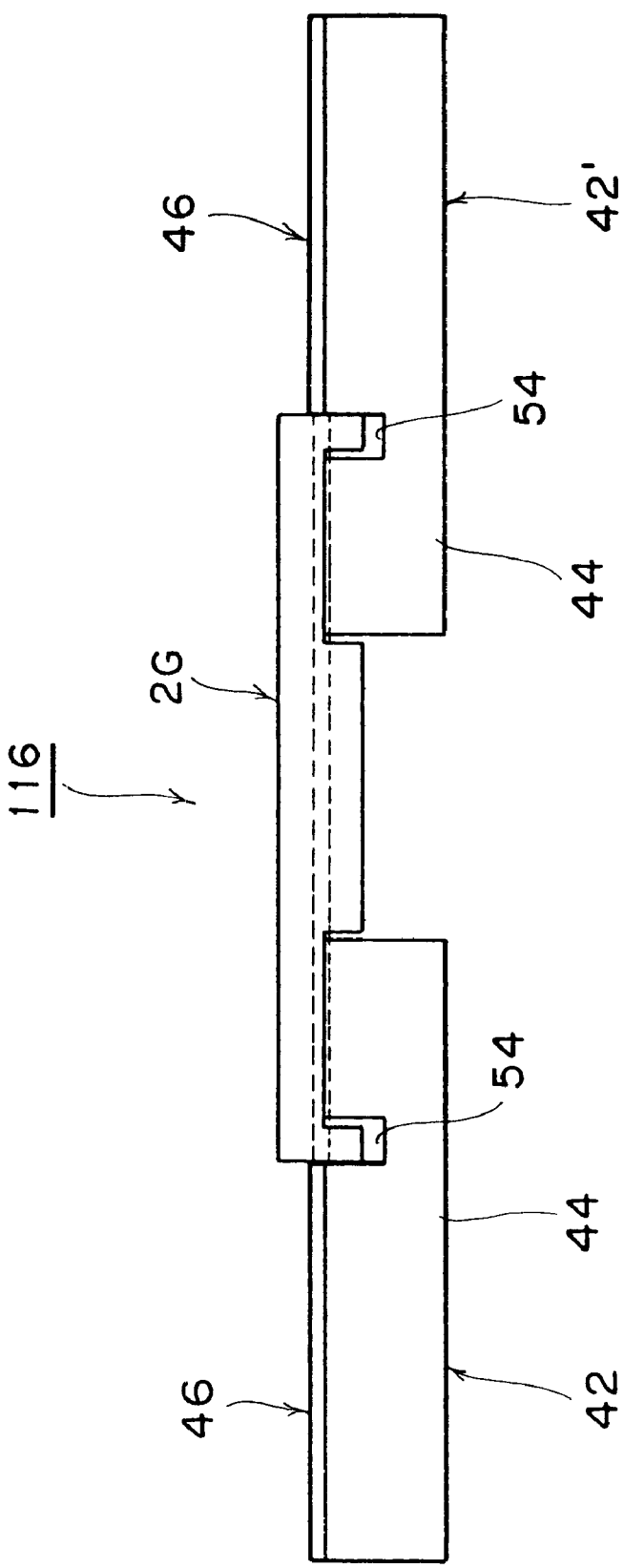
FIG. 20 is a side view of the optical module according to the ninth embodiment.

Referring to FIG. 18, there is shown an exploded perspective view of an optical module 116 according to a ninth embodiment of the invention. FIG. 19 is a perspective view of the optical module 116, and FIG. 20 is a side view of the optical module 116. In the optical module 116 of this embodiment, PLCs 42 and 42' having the same structure are optically connected to each other by a key type ferrule assembly 2G having two cutaway flat portions 10a and 10b.

Figure 21:
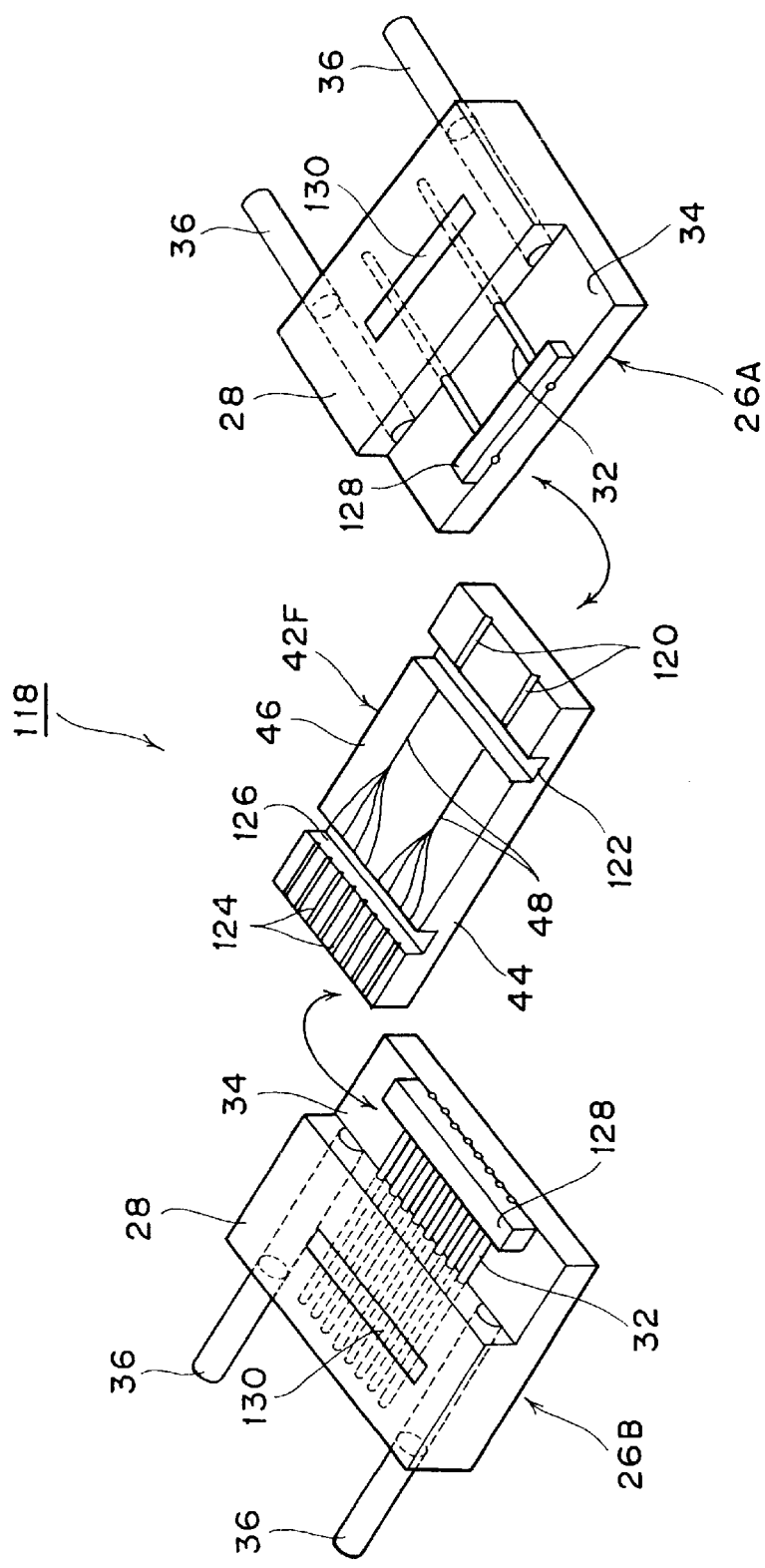
FIG. 21 is an exploded perspective view before assembly of an optical module according to a tenth embodiment of the invention.
Figure 22:
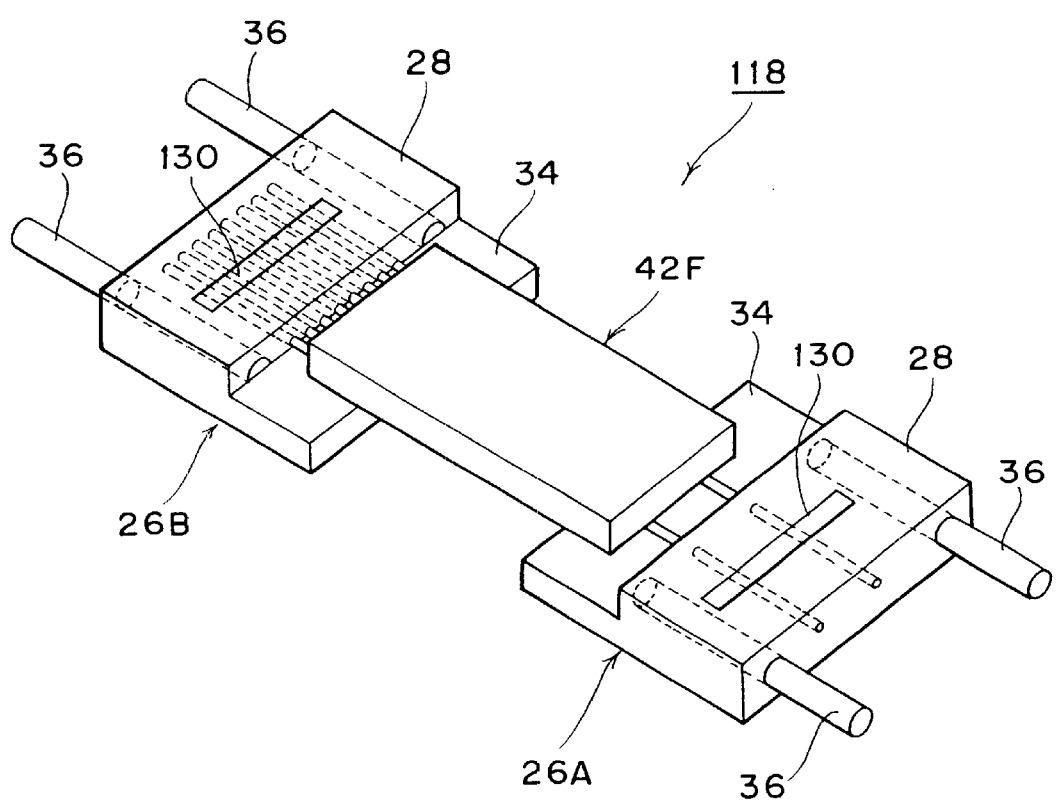
FIG. 22 is a perspective view after assembly of the optical module according to the tenth embodiment.

Referring to FIG. 21, there is shown an exploded perspective view before assembly of an optical module 118 according to a tenth embodiment of the invention. FIG. 22 shows a perspective view of the optical module 118 after assembly. In this embodiment, two block type ferrule assemblies 26A, 26B are optically coupled to each other through a PLC 42F having pluralities of V-grooves 120, 124 at both ends thereof.

An optical wave guide structure 46 of the PLC 42F has a plurality of Y-branch type optical wave guide core portions 48. At one end portion of a substrate 44, two V-grooves 120 are formed in alignment with the optical wave guide core portions 48 by etching, and a groove 122 orthogonal to the V-grooves 120 is formed by a dicing saw. At the other end portion of the substrate 44, a multiplicity of V-grooves 124 are formed in alignment with the multiplicity of branched optical wave guide portions 48 by etching, and a groove 126 orthogonal to the V-grooves 124 is formed by a dicing saw.

Block type ferrule assemblies 26A, 26B are similar to the block type ferrule assembly 26 shown in FIG. 5, and different therefrom in that one end of each of optical fibers 32 is retained by a retaining member 128. The block type ferrule assembly 26B has a number of optical fibers 32 corresponding to the number of the V-grooves 124. Numeral 130 denotes a hole for dripping of an adhesive.

In the optical module 118 of this embodiment, a light signal inputted through the block type ferrule assembly 26A is branched into a plurality of light signals, which are outputted from the block type ferrule assembly 26B. On the contrary, light signals inputted through the block type ferrule assembly 26B are joined in the PLC 42F, and the resultant light signal is outputted from the block type ferrule assembly 26A.

Figure 23:
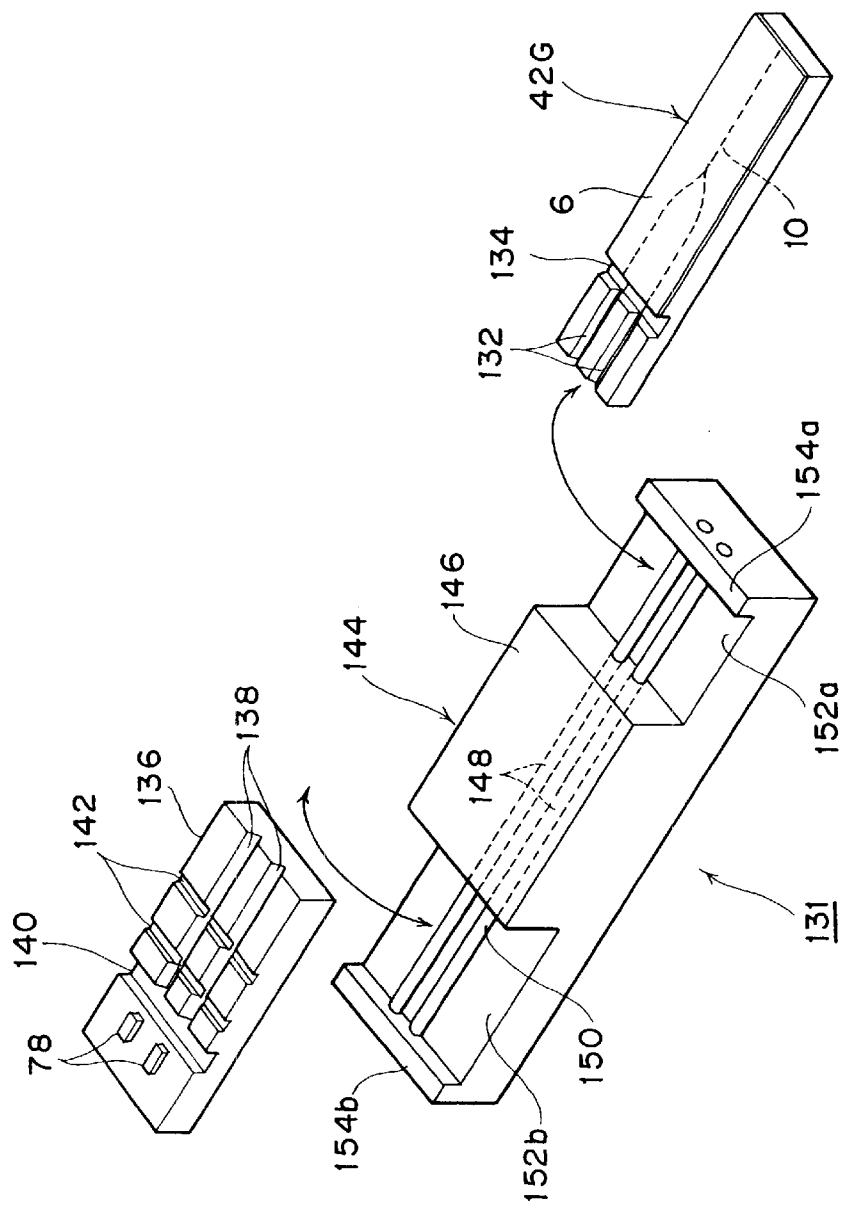
FIG. 23 is a perspective view before assembly of an optical module according to an eleventh embodiment of the invention.
Figure 24:
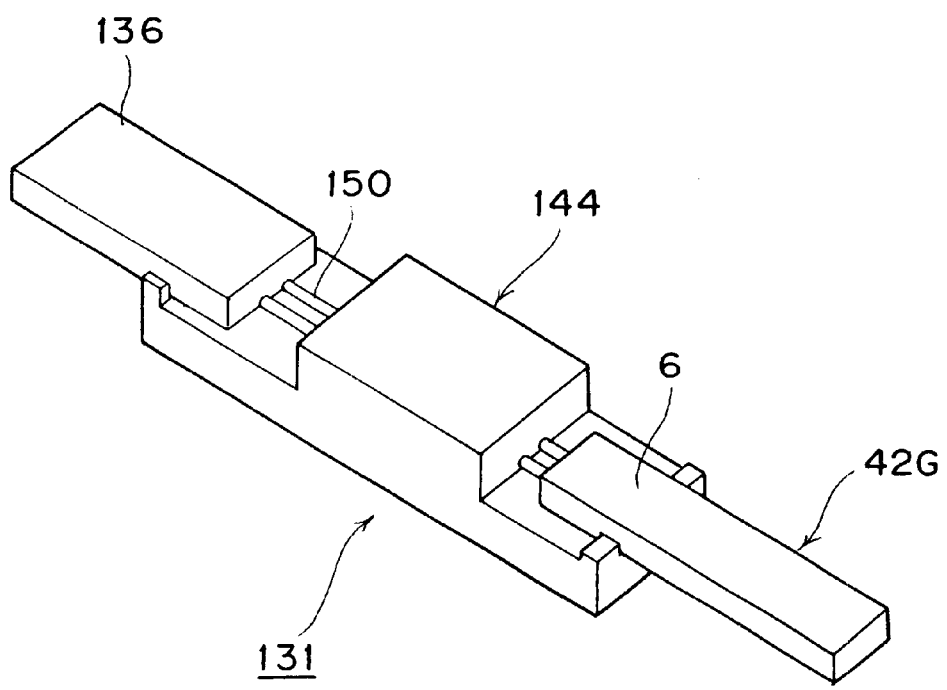
FIG. 24 is a perspective view after assembly of the optical module according to the eleventh embodiment.

Referring to FIG. 23, there is shown an exploded perspective view before assembly of an optical module 131 according to an eleventh embodiment of the invention. FIG. 24 is a perspective view of the optical module 131 after assembly. A block type ferrule assembly 144 comprises a block 146 having a plurality of through-holes 148, and a plurality of bare optical fibers 150 inserted and fixed in the through-holes 148. Each of the optical fibers 150 is held at its both ends by fiber holding portions 154a, 154b formed as one body with the block 146. The block 146 is provided with two cutaway flat portions 152a, 152b allowing the optical fibers 150 inserted and fixed in the through-holes 148 to be semi-exposed.

A PLC 42G is provided with a plurality of V-grooves 132 in alignment with a Y-branched optical wave guide core portion 10 and a groove 134 orthogonal to the V-grooves 132. A substrate 136 is provided with a plurality of V-grooves 138 and a groove 140 orthogonal to the V-grooves 138. A plurality of optical devices 78 are mounted in alignment with the V-grooves 138. Numeral 142 denotes grooves for draining an adhesive. The PLC 42G is adhered and fixed onto the cutaway flat portion 152a on one side of the block type ferrule assembly 144 in such a manner that the optical fibers 150 are fitted in the V-grooves 132 of the PLC 42G. Further, the substrate 136 is adhered and fixed onto the cutaway flat portion 152b on the other side of the block type ferrule assembly 144 so that the optical fibers 150 are fitted in the V-grooves 138 of the substrate 136. According to this embodiment, the optical devices 78 mounted on the substrate 136 and the PLC 42G are optically coupled to each other through the block type ferrule assembly 144.

According to the present invention, a receptacle-type optical module suitable for reductions in cost and size can be provided by use of a key type ferrule assembly at an interface portion for optical fibers.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A ferrule assembly comprising:

a ferrule having a through-hole, a first end, a second end, a cylindrical portion located near said first end and a flat cut portion exposing the through-hole formed between said cylindrical portion and said second end; and a bare optical fiber inserted in said through-hole and fixed therein at said cylindrical portion and a portion near said second end, said optical fiber having a first end flush with the first end of said ferrule and a second end flush with the second end of said ferrule; wherein said optical fiber has its entire circumference held by said ferrule at said cylindrical portion and said portion near the second end and said bare optical fiber is semicylindrically exposed at said flat cut portion.

2. A ferrule assembly as set forth in claim 1, wherein said ferrule has a cut worked portion at said first end portion.

3. A ferrule assembly as set forth in claim 1, wherein said ferrule has a cut worked portion at each of said first and second end portions.

* * * * *